US008616968B2

(12) United States Patent
Tripp

(10) Patent No.: US 8,616,968 B2
(45) Date of Patent: Dec. 31, 2013

(54) SECURE TOWER FOR A GAMING SYSTEM

(75) Inventor: Warren Tripp, Reno, NV (US)

(73) Assignee: Tripp Enterprises, Inc., Sparks, NV (US)

(*) Notice: Subject to any disclaimer, the term of this patent is extended or adjusted under 35 U.S.C. 154(b) by 0 days.

(21) Appl. No.: 13/455,859

(22) Filed: Apr. 25, 2012

(65) Prior Publication Data

US 2012/0276979 A1 Nov. 1, 2012

Related U.S. Application Data

(60) Provisional application No. 61/478,993, filed on Apr. 26, 2011.

(51) Int. Cl.
*A63F 13/00* (2006.01)

(52) U.S. Cl.
USPC .................... 463/30; 463/20; 463/46; 463/47

(58) Field of Classification Search
USPC .................................... 463/20, 30, 31, 46, 47
See application file for complete search history.

(56) References Cited

U.S. PATENT DOCUMENTS

| | | | | |
|---|---|---|---|---|
| 5,605,506 | A | 2/1997 | Hoorn et al. | |
| 6,039,459 | A * | 3/2000 | Chang | 362/253 |
| 6,638,170 | B1 | 10/2003 | Crumby | |
| 7,442,125 | B2 * | 10/2008 | Paulsen et al. | 463/30 |
| 7,559,092 | B2 | 7/2009 | Anson et al. | |
| 7,685,436 | B2 | 3/2010 | Davis et al. | |
| 7,867,095 | B2 | 1/2011 | Mattice et al. | |
| 8,075,408 | B2 * | 12/2011 | Hwang | 463/46 |
| 2006/0184785 | A1 | 8/2006 | Challener et al. | |
| 2006/0287095 | A1 | 12/2006 | Mattice et al. | |
| 2010/0120518 | A1 * | 5/2010 | Borissov et al. | 463/25 |
| 2010/0169636 | A1 | 7/2010 | Davis et al. | |
| 2011/0195775 | A1 * | 8/2011 | Wells | 463/29 |

* cited by examiner

*Primary Examiner* — James S McClellan
(74) *Attorney, Agent, or Firm* — Michael A. Kerr; Kerr IP Group, LLC

(57) ABSTRACT

A secure slot tower that is configured to be fixedly coupled to a gaming machine is described. The secure tower comprises a top housing component, a hollow tube, a collar, a second window segment, a printed circuit board, and a base. The hollow tube is coupled to the top housing component. Additionally, the secure tower includes pressing the base, the second window segment, the collar, the first window segment, the hollow tube, and the top housing component together. The printed circuit board is disposed between the first window segment and the second window segment and the printed circuit board comprises at least one light.

27 Claims, 10 Drawing Sheets

Figure 1 – Prior Art

SECURE TOWER FOR A GAMING SYSTEM

CROSS REFERENCE

This patent application claims the benefit of provisional patent application 61/478,993 filed on Apr. 26, 2011 and entitled SECURE TOWER FOR A GAMING SYSTEM.

FIELD OF THE INVENTION

The present invention relates to a system and method for a lighted device to indicate the status of a gaming system. More specifically, the invention relates to a tower indicator having security features to prevent tampering with the tower.

BACKGROUND

Lighted indicators are often used in conjunction with gaming systems, frequently in the form of a tower attached to the top of a gaming machine such as a slot machine. The tower typically has two colored sections through which light is emitted. The different colored sections may be used to indicate, for example, the denomination accepted by the machine, a jackpot hit, a request for assistance by the machine user, or a security breach of the machine.

Towers currently in use are often secured to the machine in a way that makes the tower vulnerable to disassembly or vandalism. For example, the tower may be removed from the machine when an exposed screw is removed. A tower that may be removed or disassembled by an unauthorized person is subject to reconfiguration. For example, the disassembled tower may have one or more of its lights disabled, rendering the tower useless for indicating a security violation. A tower that is modified or damaged may fail to report a security violation, potentially resulting in unlawful removal of money from the machine.

Thus, it is desirable to have a tower that is constructed to be inaccessible from the exterior of the gaming machine.

Additionally, typical slot towers have wiring to provide power to the internal lighting of the tower. Wires may also be used to conduct power or signal associated with lighting the slot tower. Wiring inside the slot tower may be visible from the exterior of the tower or produce undesirable shadows visible from the exterior. It is thus desirable to have a tower that conceals internal wiring such that visibility of wires and shadows from the wires are reduced or eliminated.

SUMMARY

A secure slot tower device that is configured to be fixedly coupled to a gaming machine is described. In one embodiment, the secure tower includes a cap having a notched central protrusion, a notched central tube configured to fit into the central protrusion, and a clip to couple the central tube to the cap. The clip is configured to engage with the notches of the central protrusion and the notches of the central tube. The secure tower also includes a first window segment coupled to the cap, a collar coupled to the first window segment, a second window segment coupled to the collar and a printed circuit board coupled to the collar. A base is coupled to the second window segment. The base is configured to be fixedly coupled to a housing of the gaming machine.

In the illustrative embodiment, the base is configured to be mounted to the housing of the gaming machine with one or more screws attached from the interior of the gaming machine. Additionally, the central tube includes a slot proximate to the printed circuit board. In the illustrative embodiment, the secure tower also includes electrical wires that are electrically coupled to the printed circuit board and the electrical wires enter the central tube at the base of the central tube. Additionally, the clip is configured to lock the central tube to the cap.

The central tube also includes an electrically conductive material. Furthermore, the printed circuit board in the illustrative embodiment includes a grounding tab, a perimeter grounding trace and a grounding spring. The perimeter grounding trace is conductively coupled to the grounding tab, the grounding tab is conductively coupled to the spring, and the spring is conductively coupled to the central tube.

Further still, the base of the illustrative embodiment includes a pocket to receive a spanner nut and the spanner nut is configured to engage with the central tube. Additionally, the spanner nut is included that matches the projections or tines of a spanner wrench.

Further yet, the illustrative embodiment includes a translucent colored insert and the base includes a support having a lip, wherein the second window segment rests on the support, the translucent colored insert is inserted into the second window segment, and the lip constrains lateral movement of the translucent colored insert.

In another illustrative embodiment, the secure slot tower includes a top housing component, a first printed circuit board, a hollow tube, a means for coupling the top housing component to the hollow tube, a first window segment, a collar, a second window segment, a second printed circuit board, a base and a means for coupling the base, the second window segment, the collar, the first window segment, the hollow tube and the top housing component together. The first printed circuit board is configured to be coupled to the top housing component, wherein the first printed circuit board includes at least one light. The hollow tube is configured to interface and be coupled with the top housing component. The first window segment is fixedly coupled to the top housing component and the collar is fixedly coupled to the first window segment. The second window segment is fixedly coupled to the collar. The second printed circuit board is disposed between the first window segment and the second window segment and the second printed circuit board includes at least one light. The base is fixedly coupled to the second window segment. The base, the second window segment, the collar, the first window segment, the hollow tube and the top housing component are pressed together.

The hollow tube is a grounding tube that is electrically coupled to a grounding wire. Electrical wires pass through the hollow grounding tube. The electrical wires include a first supply voltage wire and a second supply voltage wire. The first supply voltage wire is electrically coupled to the first printed circuit board. The second supply voltage wire is electrically coupled to the second printed circuit board. The printed circuit board provides a ground path to the grounding tube.

A method for assembling a secure slot tower that is configured to be fixedly coupled to a gaming machine is also described. The method includes inserting a hollow tube into a top housing component. The method couples the hollow tube to the top housing component and then inserts a first window segment that interfaces with the top housing component. A first printed circuit board is placed over the first window segment so that the hollow tube passes through a first printed circuit board opening. A collar is placed on to the first window segment so the collar interfaces with the first printed circuit board and the first window segment. A second window segment is placed on to the collar so that the second window segment interfaces with the collar. A base is placed on the second window segment so the second window segment interfaces with the base. A fastener is inserted so the fastener engages with the exterior of the hollow tube.

In the illustrative method, the base is connected to the housing of the gaming machine by coupling the base from the interior of the housing of the gaming machine. Electrical wires are passed through the hollow tube. The hollow tube is a grounding tube that is electrically coupled to a grounding wire. The electrical wires includes a first supply voltage wire that is electrically coupled to the first printed circuit board that is disposed between the first window segment and the second window segment. The base comprises an electrically conductive material that is electrically coupled to the grounding wire. In one embodiment, the top housing component is configured to receive a second printed circuit board that is electrically coupled to a second supply voltage wire that passes through the hollow tube.

DRAWINGS

The present invention will be more fully understood by reference to the following drawings which are for illustrative, not limiting, purposes.

DESCRIPTION

Figure 1:
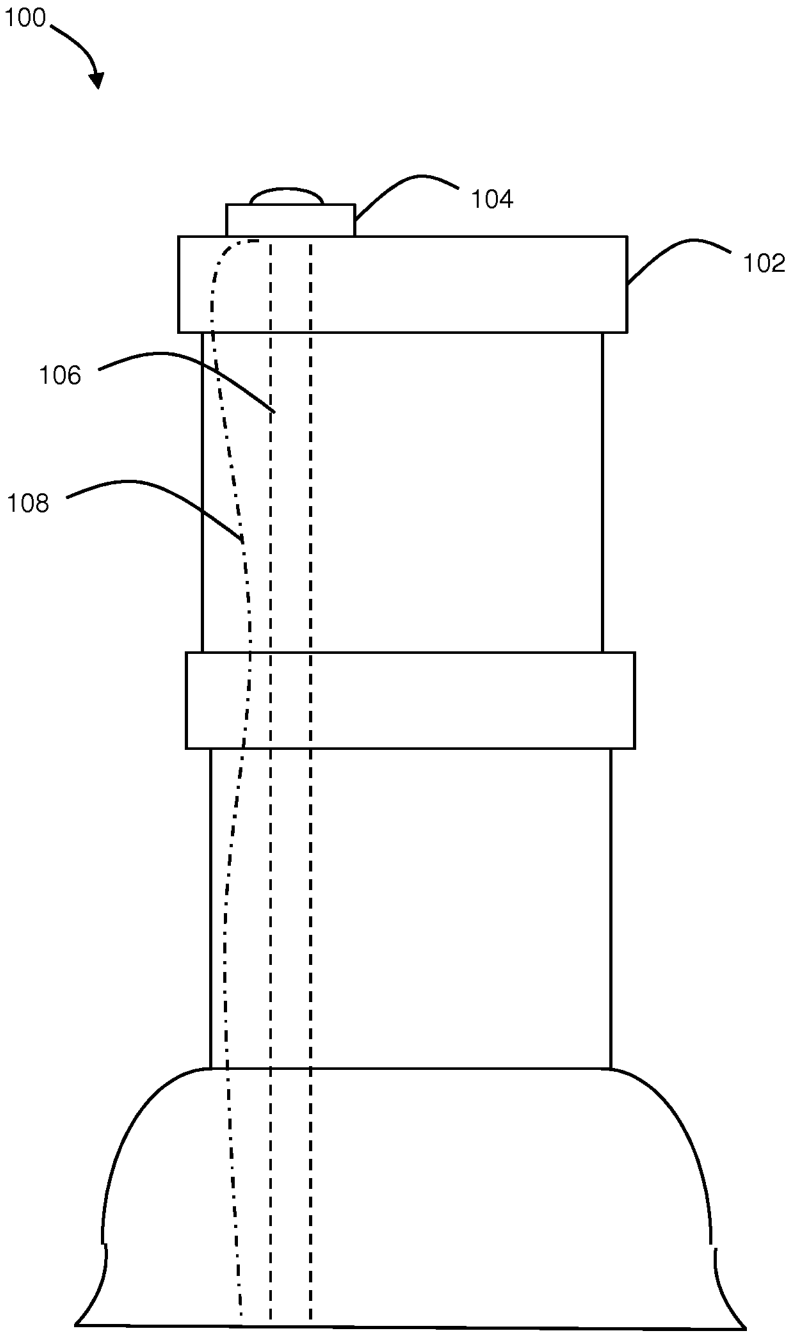
FIG. 1 shows an illustrative elevation view of a prior art tower.

Persons of ordinary skill in the art will realize that the following description is illustrative and not in any way limiting. Other embodiments of the claimed subject matter will readily suggest themselves to such skilled persons having the benefit of this disclosure. It shall be appreciated by those of ordinary skill in the art that the apparatus and systems described herein may vary as to configuration and as to details. Additionally, the methods may vary as to details, order of the actions, or other variations without departing from the illustrative method disclosed herein.

A slot tower is an indicator attached to a gaming machine that provides information about the gaming machine and its game state. For purposes of this patent, the terms "slot tower," "slot candle," "candle" and "tower" are interchangeable. In the illustrative embodiments described herein the slot tower is operatively coupled to the gaming machine such as a slot machine. The slot tower may have one or more segments, each of which are configured to emit light. The top segment may also be referred to as the top housing component for purposes of this patent. Typically, the coloration and color of light produced by each segment will differ. The light may be constant, periodic, or may be temporarily lit or flashing in response to a particular event, command, action, or game state.

A game state as used herein refers to any finite state associated with a stand-alone game machine or networked game machine, in which there are transitions between states. The game state may be triggered by a player, a game machine technician, an automated command or process, a process or action triggered remotely, or any other such action or event. For example, there may be an open door state and a close door state associated with opening the housing of the game machine, and the transitions are close door and open door.

The secure slot tower described herein has various security features that protect the tower from tampering. In one embodiment, a cap and central tube of the tower are fixedly coupled to one another with a fastener, e.g. clip, during the assembly process. To further avoid tampering, a fastener such as a spanner nut is affixed to the hollow ground tube to couple the base, the window segments, the printed circuit board(s), the collar and the top housing or cap. A disassembling means such as a spanner wrench keyed to the illustrative spanner nut is described. The illustrative spanner wrench is required to install or remove the illustrative spanner nut.

The secure slot tower described herein lacks any exposed connectors and prevents the tower from being disassembled from the exterior of the gaming machine. To install or remove the tower, the housing of the gaming machine must be opened. The tower is placed on the exterior of the top panel of the game machine housing and affixed to the top panel with mounting screws that hold the tower in place from the interior of the machine. When the housing of the game machine is closed, the tower cannot be removed or dismantled.

The hollow tube described herein serves a variety of purposes including, but not limited to, being a grounding tube that serves as the common ground path for many different electrical components in the secure slot tower. Additionally, the hollow ground tube passes electrical wires to one or more printed circuit boards that include light emitting diode (LED) circuits that are powered and controlled by the electrical wires passing through the hollow grounds tube.

Referring to FIG. 1, there is shown an illustrative elevation view of a prior art tower 100. The tower has removable cap 102 that is held in place by nut 104 attached to rod 106. The cap may be removed when the nut is disengaged from the rod, allowing the tower unit to be disassembled by anyone capable of removing the nut from the device. Rod 106 provides grounding and support for the tower. Wiring 108 may be partially concealed behind rod 106, however, the wire or shadows from the wire may be visible from the exterior of the tower.

Figure 2:
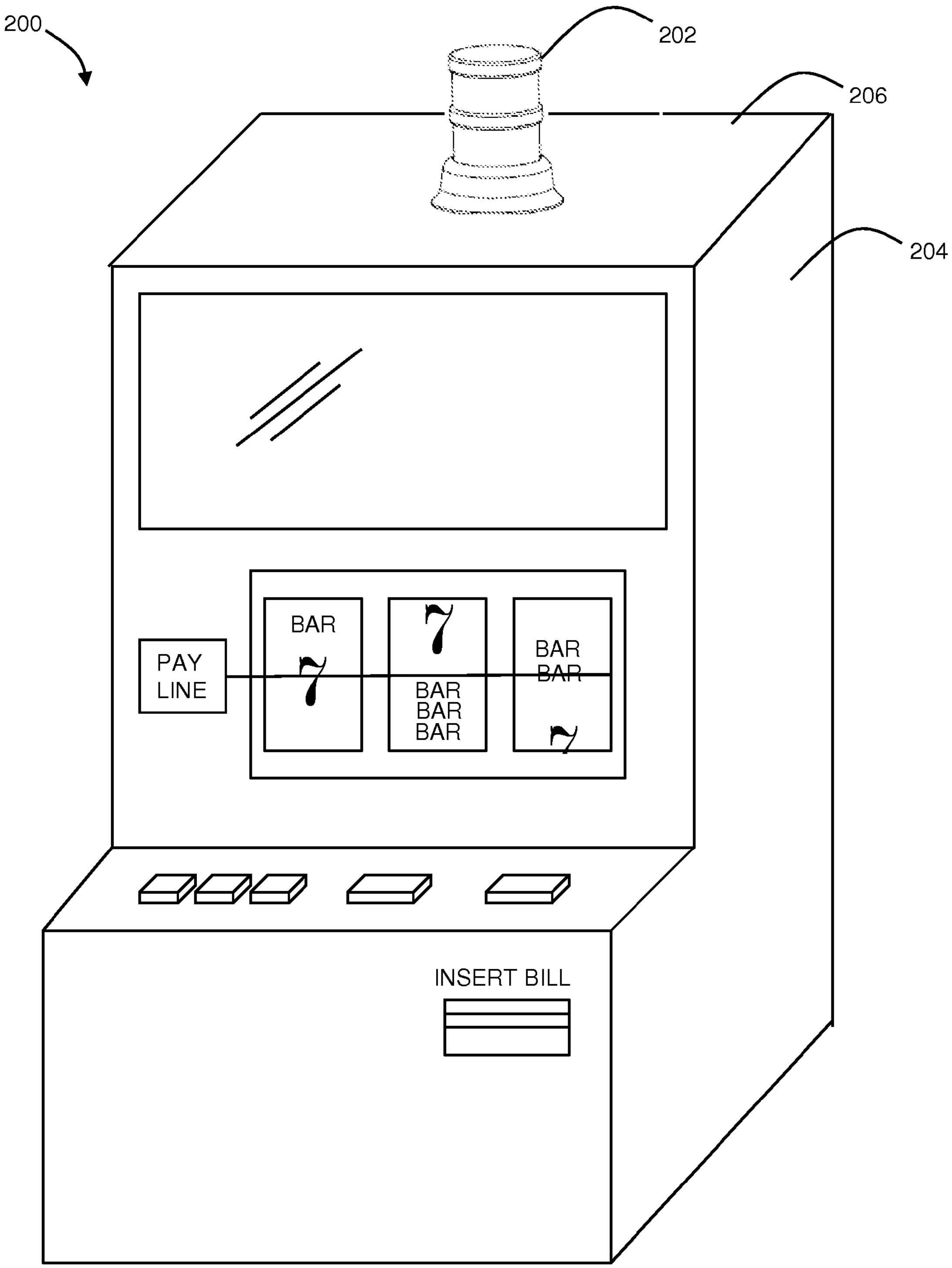
FIG. 2 shows a perspective view of an illustrative secure tower mounted on a gaming machine.

Referring now to FIG. 2, there is shown an illustrative gaming machine 200 having an illustrative secure tower 202 mounted thereon. The illustrative gaming machine shown is a slot machine. However, the secure tower 202 may be used as an indicator for other machines on a casino floor such as a card shuffler, table game, kiosk, automated teller machine (ATM), and other such machines on the casino floor. The secure tower 202 is not removable from gaming machine 200 when the machine is closed as shown in FIG. 2. To install or remove the secure tower, the housing of the illustrative gaming machine must first be opened with a housing door (not shown) or a housing panel (not shown). When the game machine housing is open, the interior surface of the upper panel 206 is accessible and the secure tower 202 is affixed to upper panel 206.

Figure 3:
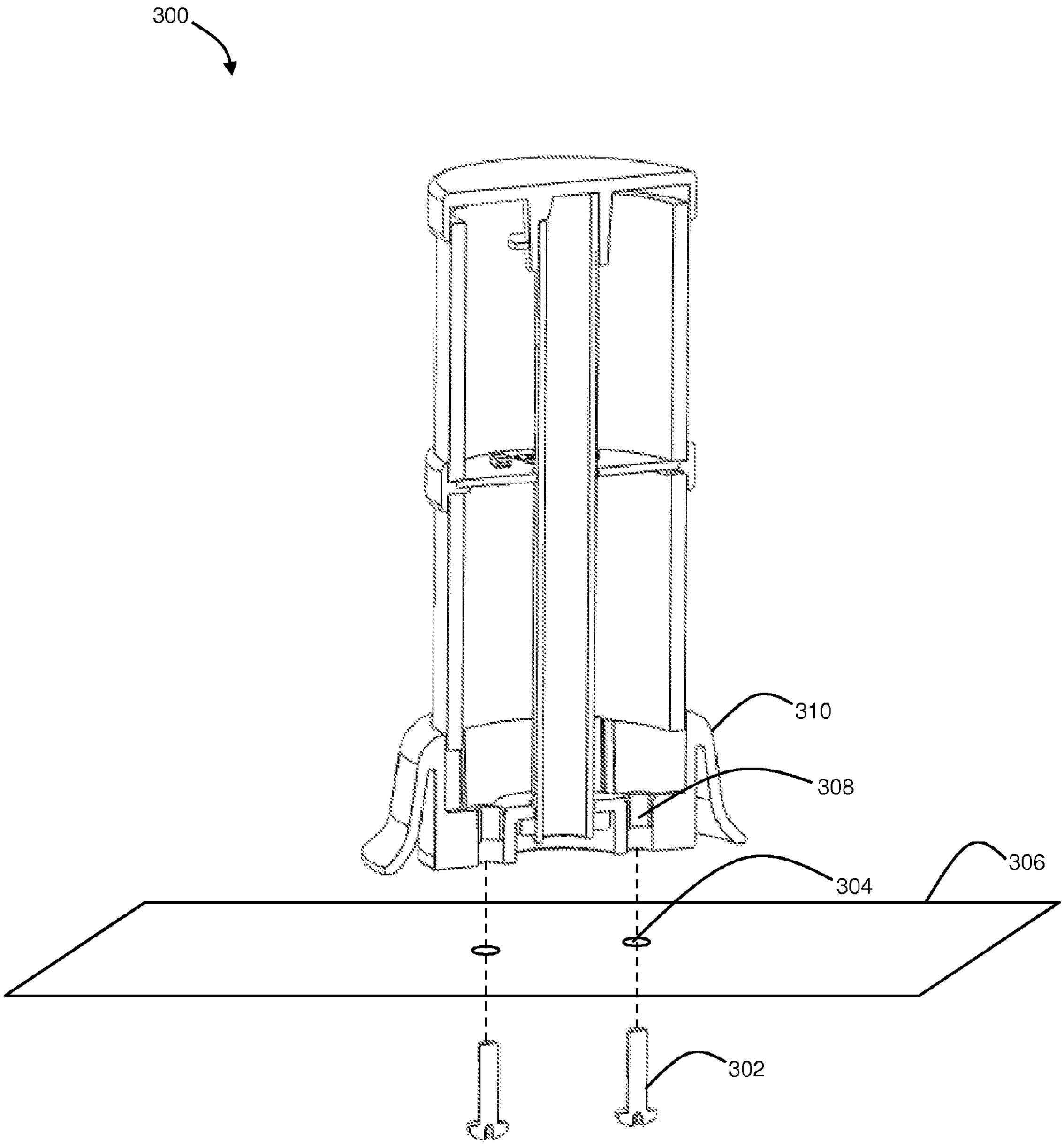
FIG. 3 shows a cross sectional view of an illustrative mounting system for the secure tower.

Referring to FIG. 3, there is shown a cross sectional view of an illustrative mounting structure 300 for the secure tower.

The secure tower is mounted to the exterior housing of a gaming machine. The housing of the gaming machine is a shell surrounding the interior components of the machine and protecting the interior components from tampering by unauthorized persons. The gaming machine housing comprises upper panel 306. An illustrative fastener such as mounting screw 302 is driven though mounting hole 304 in upper panel 306 of the gaming machine. Mounting opening 308 in base 310 of the secure tower is threaded to receive the mounting screw 302.

Other secure mounting and fastening means may be used to attach the secure tower to the gaming machine. For example, mounting and fastening means include, but are not limited to clips, screws, springs, bolts, cables, pins, dowels, nails, nuts, rivets, welding, adhesives, joints, locks, and other such components that can be used to fixedly couple the secure tower to the housing of the gaming machine.

In the illustrative embodiment, the upper housing panel of the gaming machine may be removable from the machine or may be accessed from the interior of the machine when the machine is opened. For example, the machine housing may comprise a door which allows the front panel of the machine to swing open and expose the interior components of the machine. When the gaming machine is closed, illustrative mounting screws 302 are located within the machine, and are inaccessible to those lacking authorization to access the gaming machine. Because none of the mounting hardware is accessible from the exterior of the machine, the secure tower is protected from tampering by unauthorized individuals.

Figure 4A:
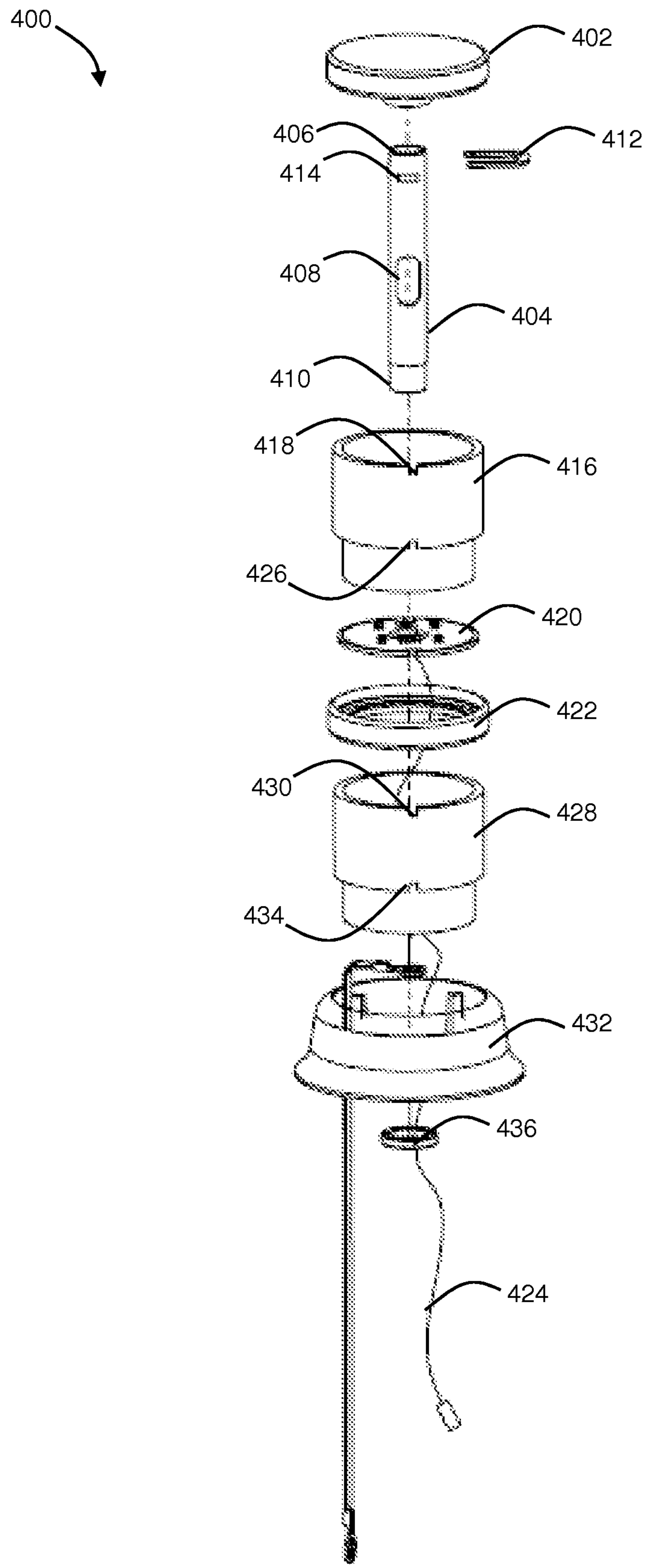
FIG. 4A shows an exploded view of a first illustrative secure tower.

Referring to FIG. 4A, an exploded view of the illustrative secure tower 400 is shown. The illustrative secure tower comprises a cap 402, which may be fabricated from plastic. In some embodiments, the cap is fabricated from a plastic plated with a conductive metal. The conductive metal is plated on the exterior surface of the cap. Cap 402 has a central protrusion projecting from the interior surface of the cap, shown in more detail in FIG. 5. The assembly process for the secure tower begins with the insertion of the upper end 406 of central tube 404 into the central protrusion of cap 402. Central tube 404 may be fabricated from a conductive metal, such as brass. The central tube may also be referred to as a "grounding rod" and may serve the purpose of dissipating electrical shock applied to the machine. Central tube has slot 408. Electrical wiring required for the secure tower enters the central tube through its lower opening 410 and exits the tube at slot 408. In this manner, tower wiring is obscured within the tube and is not visible from the exterior of the tower.

The electrical wires include one or more wires for delivering power or signal to the printed circuit board (PCB) that are bundled into an illustrative shielded wire 424. The supply voltage wiring (not shown) is connected to a power source within the gaming machine. The signal wiring (not shown) is communicatively coupled to a controller, CPU, logic or other such processing means associated with the gaming machine.

Next, the illustrative fastener clip 412 is inserted into notches 414 of central tube 404. The clip also fits into notches of the central protrusion of cap 402, as shown in more detail in FIG. 5. The clip may be fabricated from a resilient metal. In the illustrative embodiment the clip is stamp-fabricated 18 gauge stainless steel. The clip provides a means for coupling the cap 402 to the central tube 404. Other means for coupling the cap 402 to the central tube 404 include, but are not limited to clips, screws, springs, bolts, cables, pins, dowels, nails, nuts, rivets, welding, adhesives, joints, locks, and other such components that can be used to join the cap 402 to the central tube 404.

The illustrative secure tower further comprises two window segments, first window segment 416 and second window segment 428. In some embodiments, the tower has only one window segment or "stage." In other embodiments, the tower has three or more window segments. First window segment 416 is inserted into the lip of cap 402. Notch 418 of window segment 416 engages with a tab 514 (see FIG. 5) of the cap. The window segments may be fabricated from a clear plastic such as clear acrylic. In some embodiments, the window segment is a translucent colored insert. In other embodiments, a translucent colored insert is a separate component, such as a tube-shaped insert, placed within a clear window segment. The translucent colored insert is a gel or other translucent colored material such as vinyl, polycarbonate, or PVC. The color of the translucent colored insert generally provides information about the gaming machine, such as a denomination accepted by the machine, or information about the game state of the gaming machine, such as a jackpot in progress. The translucent colored insert is generally sufficiently transparent to allow light to pass through the insert. In some embodiments, the window segments are fabricated from semi-opaque or frosted plastic and colored LEDs are used in lieu of colored inserts.

Next, PCB 420 is placed over first window segment 416. The PCB has a central hole to allow central tube 404 to pass through the PCB. Wiring 424 provides signal and power to the PCB and is fed through the central tube 404. Collar 422 is placed over the PCB and the first window segment. Tabs of collar 422 engage with notches 426 of the first window segment. The collar has a circumferential ledge to support the PCB. By way of example and not of limitation, the collar may be fabricated from a metal plated plastic.

The second window segment 428 is then inserted into the lip of collar 422. The tabs of collar 422 are configured to engage with notches 430 of the second window segment. Optionally, a colored insert is placed within the second window segment.

Base 432 is placed over second window segment 428. The base may be fabricated from metal plated plastic, for example chrome plated plastic. Tabs 434 of the base engage with notches 430 of the second window segment.

A fastener such as illustrative spanner nut 436 is threaded to mate with the threaded lower end 410 of central tube 404. The central tube extends through the first window segment 416, PCB 420, collar 422, second window segment 428, and base 432. When the spanner nut is installed, each of these components are tightly engaged with a compression force that renders the secure tower assembly difficult to disassemble without removal of the spanner nut. The spanner nut fits into a pocket molded into the lower portion of the base, as shown in greater detail in FIGS. 6 and 10. Locating the spanner nut in a pocket makes the spanner nut difficult to disengage without a specialized spanner wrench sized to fit in the pocket. The spanner nut has gaps that are keyed to mate with tabs of the specialized spanner wrench in FIG. 8.

The illustrative spanner nut 436 provides a means for fastening the base, the second window segment, the collar, the first window segment, the hollow tube and the top housing component together. Other fastening means may also be used such as a clip, screw, spring, bolt, cable, pin, dowel, nail, nut, rivet, weld, adhesive, joint, lock, and other such components that can be used to for joining or coupling the base, the second window segment, the collar, the first window segment, the hollow tube and the top housing component together.

Figure 4B:
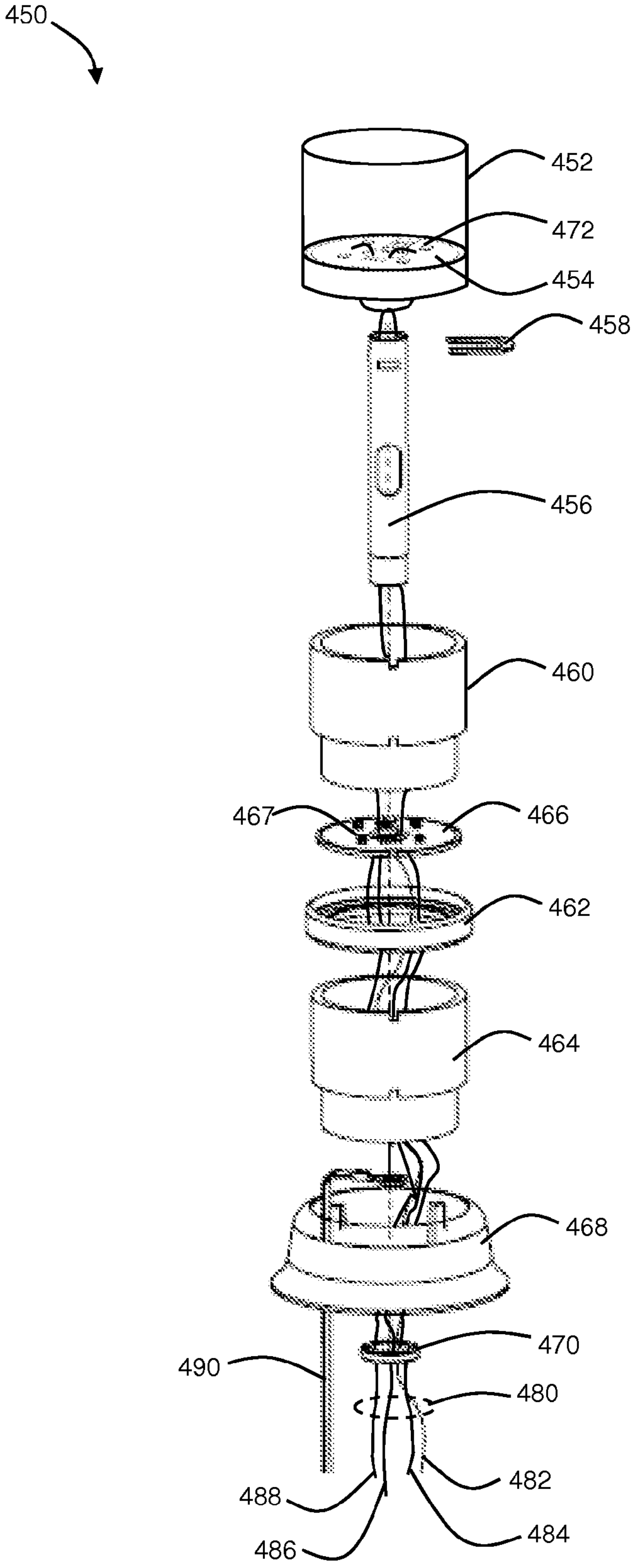
FIG. 4B shows an exploded view of a second illustrative secure tower.

Referring now to FIG. 4B there is another illustrative embodiment of a secure tower 450. The secure slot tower 450 includes a top housing component 452, a first PCB 454, a hollow tube 456, a clip 458, a first window segment 460, a collar 462, a second window segment 464, a second PCB 466, a base 468 and a spanner nut 470 for pressing the base 468, the second window segment 464, the collar 462, the first window segment 460, the hollow tube 456 and the top housing component 452 together.

The first PCB 454 is configured to be coupled to the top housing component 452. The top housing component includes first PCB 454, which has at least one light 472. Additionally, the bottom portion of the top housing 452 is similar to cap 402, shown in FIG. 4A. The hollow tube 456 is configured to interface and be coupled with the top housing component 452 with a fastening means such as clip 458. The first window segment 460 is fixedly coupled to the top housing component 452 and the collar 462 is fixedly coupled to the first window segment 460. The second window segment 464 is fixedly coupled to the collar 462. The second PCB 466 is disposed between the first window segment 460 and the second window segment 464 and the second PCB 466 includes at least one light 467. The base 468 is fixedly coupled to the second window segment 464. The base 468, the second window segment 464, the collar 462, the first window segment 460, the hollow tube 456 and the top housing component 452 are joined together with a fastening means such as a spanner nut 470 that interfaces the bottom portion of the hollow tube 456 that is threaded to receive the spanner nut 470.

The hollow tube 456 is a grounding tube that is electrically coupled to a grounding wire 490. Electrical wires 480 pass through the hollow grounding tube 456. The illustrative electrical wires 480 include a first supply voltage wire 482, a first signal wire 484, a second supply voltage wire 486 and a second signal wire 488. The first supply voltage wire 482 and the first signal wire 484 are electrically coupled to the first PCB 454. The second supply voltage wire 486 and second signal wire 488 are electrically coupled to the second PCB 466.

The first signal wire 484 is configured to control at least one light 467 associated with first PCB 454 as described herein. The second signal wire 488 is configured to control at least one light 467 disposed on the second PCB 466 as described herein. In the illustrative embodiment, the first PCB 454 and second PCB 466 provide a ground path to the grounding tube 456.

The method for assembling the secure slot tower 450 includes inserting the hollow tube 456 into the top housing component 452. As described above, the illustrative top housing component includes the first PCB 454 that has at least one light 472. The hollow tube 456 is coupled to the top housing component 452 with a fastening means such as a clip, screw, spring, bolt, cable, pin, dowel, nail, nut, rivet, weld, adhesive, joint, lock, and other such components that can be used to combine or join two separate elements. The illustrative fastener is clip 458. In an alternative embodiment, the hollow tube 456 is molded in place within top housing component 452. Hollow tube 456 and top housing component 452 may alternatively be molded as a single component.

Subsequently, the first window segment 460 is configured to interface with the top housing component 452. The second PCB 466 is placed over the first window segment 460 so that the hollow tube 456 passes through the PCB 466 opening. As stated above, the collar 462 is then placed on to the first window segment 460 so the collar interfaces with PCB 466 and first window segment 460. The second window segment 464 is placed on to the collar 462 so that the second window segment interfaces with the collar. The base 468 is placed on the second window segment 464 so the second window segment interfaces with the base. As described above, a fastening means such as the spanner nut 470 interfaces with the bottom portion of the hollow tube 456 that is threaded to receive the spanner nut 470. As described herein, the illustrative fastening means include a clip, screw, spring, bolt, cable, pin, dowel, nail, nut, rivet, weld, adhesive, joint, lock, and other such components that can be used to combine or join two separate elements.

Figure 5:
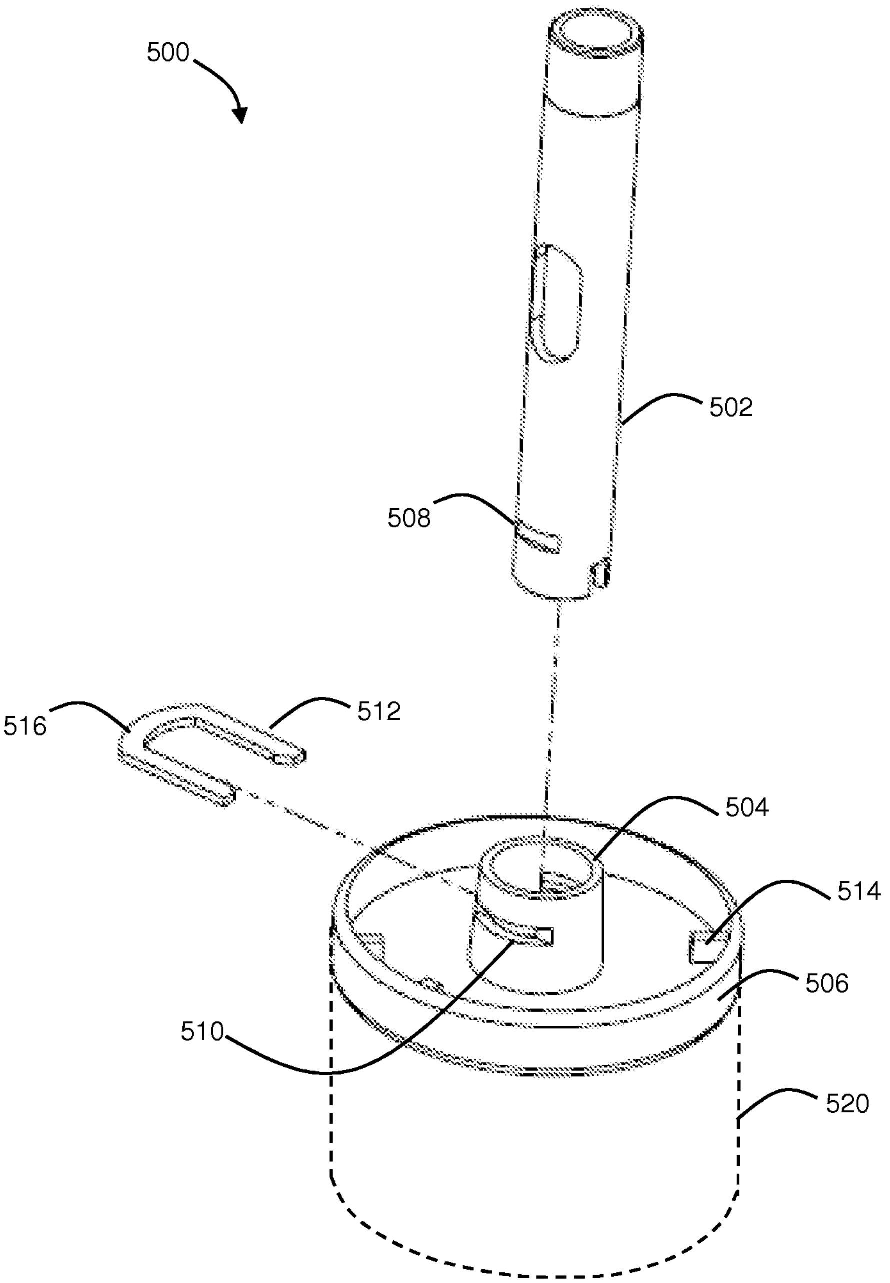
FIG. 5 shows an exploded view of an illustrative cap and central tube assembly of the secure tower.

Referring now to FIG. 5, an exploded view of an illustrative cap and central tube assembly 500 is shown. Central tube 502 is inserted into the central protrusion 504 of cap 506 or illustrative top housing 520 (similar to top housing 452 described above) having a bottom portion similar to cap 506. Central tube 502 has notches 508 which are aligned with notches 510 of the cap when the central tube is inserted into the cap or top housing. After the central tube has been inserted into the cap, illustrative clip 516 is inserted into the notches 510 of central protrusion 504. Arms 512 of the clip engage with notches 510 of the central protrusion and notches 508 of the central tube. In this manner, the illustrative clip secures central tube 502 to cap 506. Once the clip has been inserted, it is difficult to remove the clip from the cap. The difficulty of removing the clip from the cap provides a further barrier to tampering with the secure tower. Notch 418 of window segment 416 (see FIG. 4) engages with tab 514 of the cap.

Figure 6:
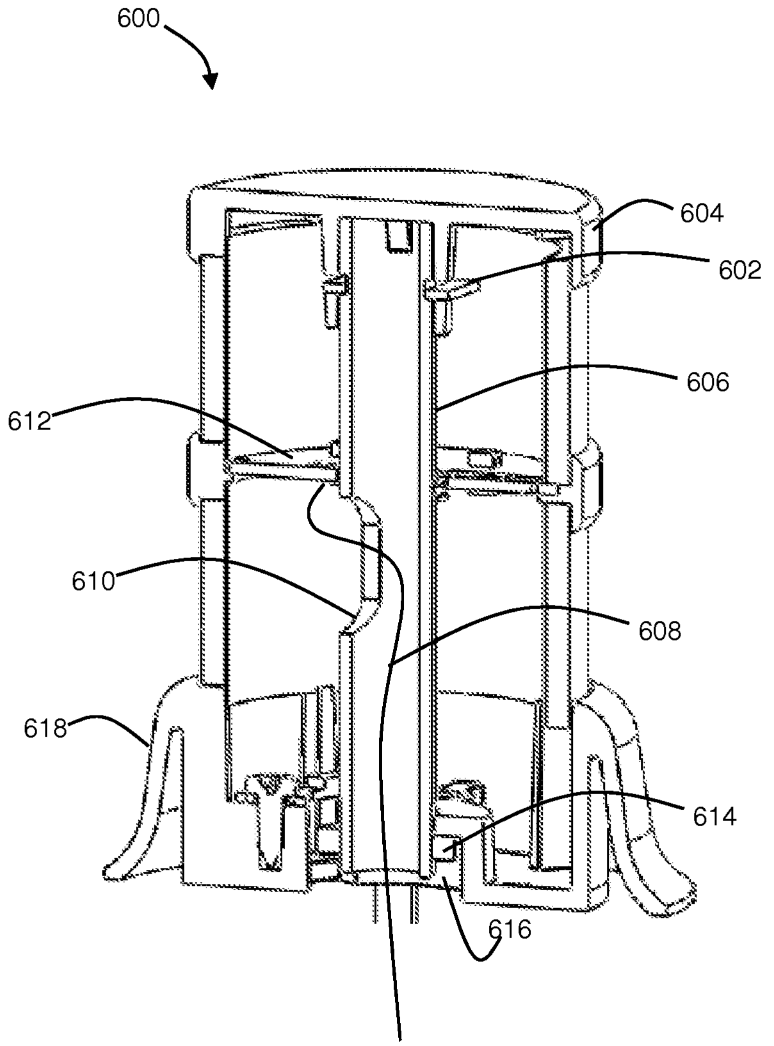
FIG. 6 shows a cross sectional view of the illustrative secure tower.

Referring to FIG. 6, a cross sectional view 600 of the illustrative secure tower is shown. In FIG. 6, illustrative clip 602 is shown assembled to cap 604 and central tube 606. Wiring 608 is shown entering the secure tower through the lower opening of the central tube and exiting the central tube at slot 610 of the central tube. The wiring is electrically coupled to PCB 612. Spanner nut 614 is shown assembled to central tube 606. To assemble the spanner nut to the central tube, the spanner nut is inserted into pocket 616 of base 618. The threaded interior surface of the spanner nut engages with a threaded exterior portion of the lower end of the central tube. A spanner wrench sized to fit into pocket 616 and keyed to match indentations in the spanner nut is used to tighten the connection between the spanner nut and the central tube. The spanner wrench is shown in FIG. 8.

Figure 7:
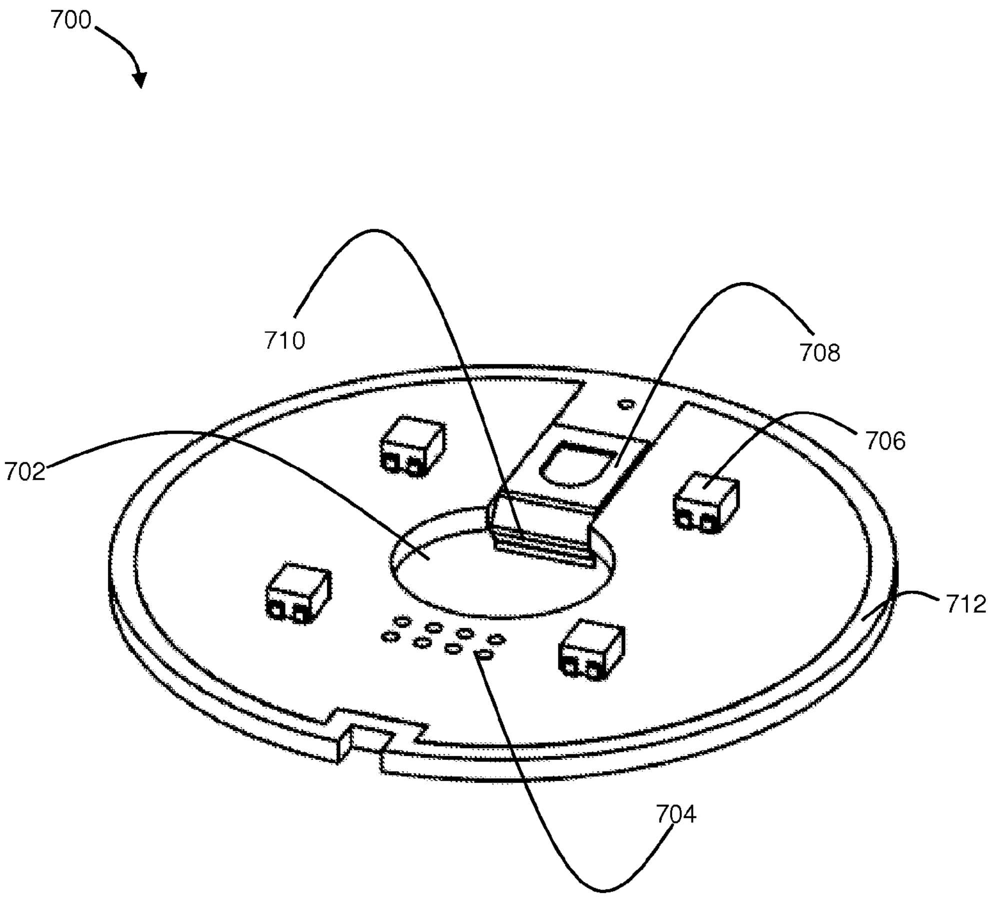
FIG. 7 shows an illustrative printed circuit board for a secure tower.

Referring to FIG. 7, an illustrative PCB 700 for a secure tower is shown. The PCB has central hole 702 that allows the central tube to pass through the center of the PCB. Wiring to provide power and signal to the PCB is connected to the PCB at one or more solder points 704. In an alternative embodiment, the wiring may be connected to the PCB with a connector or any other means for electrically coupling wiring to a PCB. One or more upper stage lights 706 are located on the upper side of the PCB and provide light for the first window segment. One or more lower stage lights (not shown) are located on the lower side of the PCB and provide light for the second window segment. The lights may be light emitting diodes (LED). Grounding tab 708 comprises spring 710 that is urged against the central tube when the PCB is installed in the secure tower. The grounding tab is conductively coupled to the central tube such that there is a common ground between the components. The grounding tab is also conductively coupled to perimeter ground trace 712. The perimeter ground trace is conductively coupled to the plating of collar 422, such that the collar shares a common ground with the central tube and the PCB. In this way, the circuitry is protected from electric shock that may be applied to the secure tower or gaming machine. The conductive material of the central tube will dissipate an electric shock applied to the tower or the machine.

Figure 8:
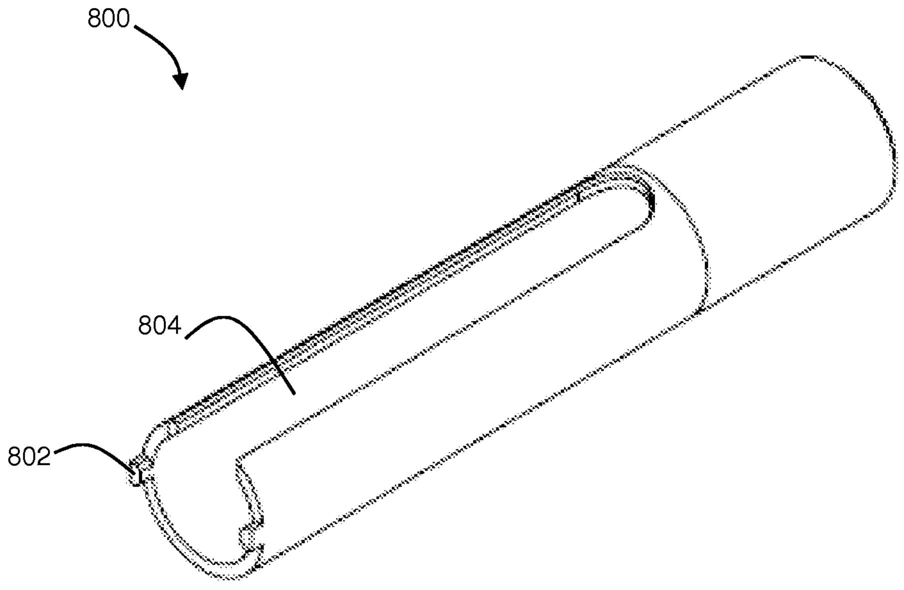
FIG. 8 shows an illustrative spanner wrench.

Referring now to FIG. 8, illustrative spanner wrench 800 is shown. The inner diameter and outer diameter of the spanner wrench are configured to allow the wrench to fit into pocket 616 of the base of the secure tower, as shown in FIG. 6. The spanner wrench comprises tines 802 which mate with indentations in the spanner nut. It will be recognized that various numbers and configurations of tines may be used. The unique configuration of wrench diameter and tines required to install or remove the spanner nut acts as a security measure against tampering with the secure tower. Even a person who has access to the interior of the gaming machine will have difficulty disassembling the secure tower without the spanner wrench keyed to match the spanner nut. The spanner wrench further comprises slot 804, which provides a space for the wiring to occupy while the spanner nut is adjusted with the spanner wrench.

Figure 9:
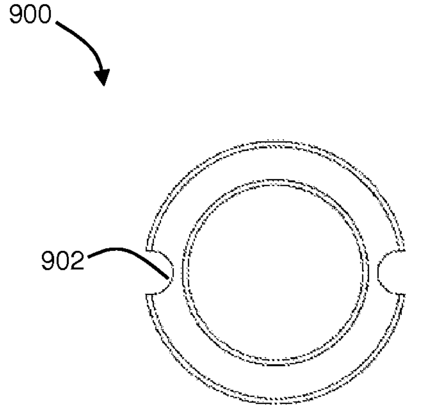
FIG. 9 shows an illustrative spanner nut.

Referring to FIG. 9, illustrative spanner nut 900 is shown. The interior diameter and exterior diameter of the nut are configured to allow the nut to fit into pocket 616 of the base of the secure tower, as shown in FIG. 6. Indentations 902 are keyed to match the tines 802 of the spanner wrench. The interior surface of the spanner nut is threaded to mate with the threaded exterior surface of the central tube.

Figure 10:
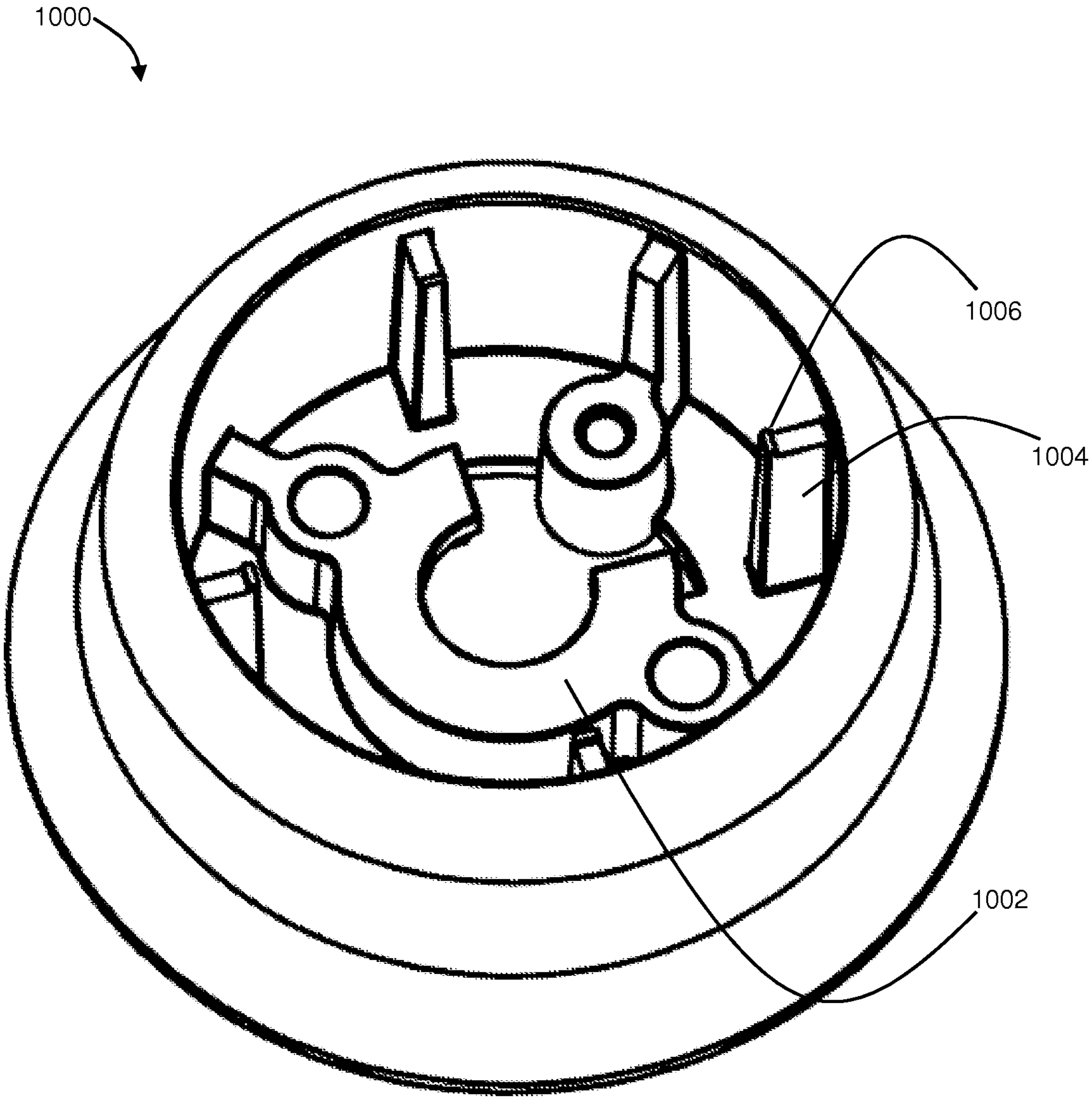
FIG. 10 shows a perspective view of an illustrative base for a secure tower.

Referring now to FIG. 10, a perspective view of illustrative base 1000 for the secure tower device is shown. The base comprises pocket 1002, configured to receive the spanner nut shown in FIG. 9. The upper side of the base is shown in FIG. 10; the spanner nut enters the pocket from the lower side of the base. The base also comprises support 1004 to support the second window segment. Support 1004 comprises lip 1006. The lip constrains the lateral movement of the second window segment.

It is to be understood that the detailed description of illustrative embodiments are provided for illustrative purposes. The scope of the claims is not limited to these specific embodiments or examples. Therefore, various process limitations, elements, details, and uses can differ from those just described, or be expanded on or implemented using technologies not yet commercially viable, and yet still be within the inventive concepts of the present disclosure. The scope of the invention is determined by the following claims and their legal equivalents.

What is claimed is:

1. A secure slot tower that is configured to be fixedly coupled to a gaming machine, the secure slot tower comprising:
- a cap having a notched central protrusion;
- a notched central tube configured to fit into the central protrusion, wherein the central tube has a top and a base;
- a clip to couple the top of the central tube to the cap, wherein the clip is configured to engage with the notched central protrusion and the notched central tube;
- a first window segment coupled to the cap;
- a collar coupled to the first window segment;
- a second window segment coupled to the collar;
- a printed circuit board coupled to the collar; and
- a base coupled to the second window segment, the base configured to be fixedly coupled to a housing of the gaming machine.

2. The secure tower of claim 1, wherein the base is configured to be mounted to the housing of the gaming machine with one or more screws driven from the interior of the gaming machine.

3. The secure tower of claim 1, wherein the central tube further comprises a slot proximate to the printed circuit board.

4. The secure tower of claim 3, further comprising a plurality of electrical wires configured to be electrically coupled to the printed circuit board, wherein the plurality of electrical wires enters the central tube at the base of the central tube.

5. The secure tower of claim 1, wherein the clip locks the central tube to the cap.

6. The secure tower of claim 1, wherein the central tube comprises an electrically conductive material.

7. The secure tower of claim 6, wherein the printed circuit board further comprises:
- a grounding tab;
- a perimeter ground trace;
- a grounding spring;
- wherein the perimeter ground trace is conductively coupled to the grounding tab;
- wherein the grounding tab is conductively coupled to the spring; and
- wherein the spring is conductively coupled to the central tube.

8. The secure tower of claim 1, wherein the base further comprises a pocket to receive a spanner nut, the spanner nut configured to engage with the central tube.

9. The secure tower of claim 8, wherein the spanner nut comprises notches, the notches configured to match the projections of a spanner wrench.

10. The secure tower of claim 1, further comprising a translucent colored insert and the base includes a support having a lip, wherein the second window segment rests on the support, the translucent colored insert is inserted within the second window segment, and the lip constrains lateral movement of the translucent colored insert.

11. A secure slot tower that is configured to be fixedly coupled to a gaming machine, the secure tower comprising:
- a top housing component;
- a first printed circuit board configured to be coupled to the top housing component, wherein the first printed circuit board includes at least one light;
- a hollow tube configured to interface with the top housing component;
- a means for coupling the top housing component to the hollow tube;
- a first window segment fixedly coupled to the top housing component;
- a collar fixedly coupled to the first window segment;
- a second window segment fixedly coupled to the collar;
- a second printed circuit board disposed between the first window segment and the second window segment, wherein the second printed circuit board includes at least one light;
- a base fixedly coupled to the second window segment;
- a means for coupling the base, the second window segment, the collar, the first window segment, the hollow tube, and the top housing component together; and
- a translucent colored insert and the base includes a support having a lip, wherein the second window segment rests on the support, the translucent colored insert is inserted within the second window segment, and the lip constrains lateral movement of the translucent colored insert.

12. The secure tower of claim 1, wherein the base is configured to be mounted to the housing of the gaming machine with one or more screws driven from the interior of the gaming machine.

13. The secure tower of claim 12 further comprising a plurality of electrical wires that pass through the hollow tube, wherein the hollow tube is a grounding tube that is electrically coupled to a grounding wire.

14. The secure tower of claim 13, wherein the plurality of wires includes a first supply voltage wire and second supply voltage wire.

15. The secure tower of claim 14, wherein the first supply voltage wire is electrically coupled to the first printed circuit board and the second supply voltage wire is electrically coupled to the second printed circuit board.

16. The secure tower of claim 15, wherein at least one printed circuit board provides a ground path to the grounding tube.

17. The secure tower of claim 11, wherein the hollow tube further comprises a slot proximate to the printed circuit board.

18. The secure tower of claim 11, wherein the hollow tube and the base comprise an electrically conductive material.

19. The secure tower of claim 11, wherein the means for coupling the base, the second window, the collar, the first window, the hollow tube, and the top housing component together comprises a nut configured to engage with the hollow tube.

20. A method for assembling a secure slot tower that is configured to be fixedly coupled to a gaming machine, the method for assembly comprising:

inserting a notched central tube into a top housing component;

coupling the notched central tube to the top housing component with a clip configured to engage the to housing component and the notched central tube;

inserting a first window segment that interfaces with the top housing component;

placing a first printed circuit board over the first window segment so that the notched central tube passes through a printed circuit board opening;

placing a collar on to the first window segment so the collar interfaces with the printed circuit board and the first window segment;

placing a second window segment on to the collar so that the second window segment interfaces with the collar;

placing a base on the second window segment so the second window segment interfaces with the base; and inserting a fastener so the fastener engages with the exterior of the notched central tube.

21. The method of claim 20, further comprising connecting the base to the housing of the gaming machine by coupling the base from the interior of the housing.

22. The method of claim 20, further comprising passing a plurality of electrical wires through the notched central tube, wherein the notched central tube is a grounding tube that is electrically coupled to a grounding wire.

23. The method of claim 22, wherein the plurality of electrical wires includes a first supply voltage wire.

24. The method of claim 23 further comprising electrically coupling the first supply voltage wire to the first printed circuit board disposed between the first window segment and the second window segment.

25. The method of claim 20 wherein the notched central tube comprises an electrically conductive material.

26. The method of claim 20 wherein the base comprises an electrically conductive material that is electrically coupled to the grounding wire.

27. The method of claim 20 wherein the top housing component is configured to receive a second printed circuit board that is electrically coupled to a second supply voltage wire that passes through the notched central tube.

* * * * *